April 7, 1970  G. R. HARRIS  3,504,585
AUTOMATED MACHINE TOOLS
Filed Oct. 27, 1967  3 Sheets-Sheet 1

INVENTOR.
GERALD R. HARRIS
BY Warren, Rubin
Brucker & Chickering
ATTORNEYS

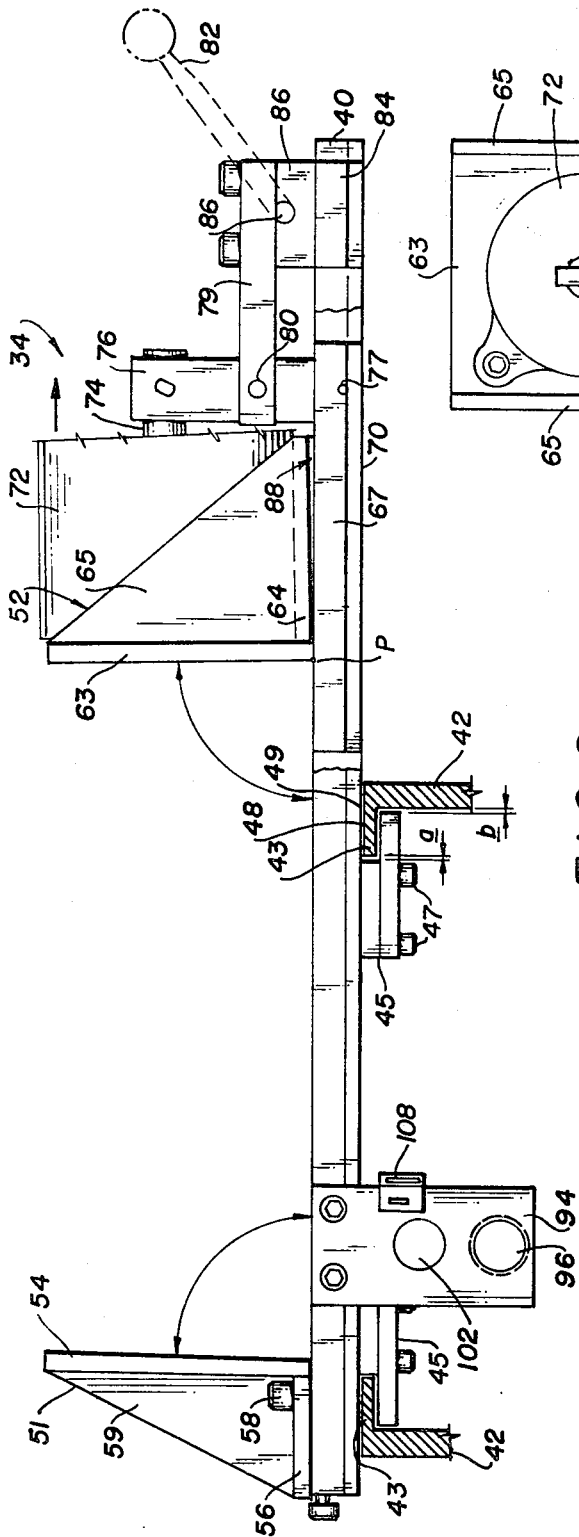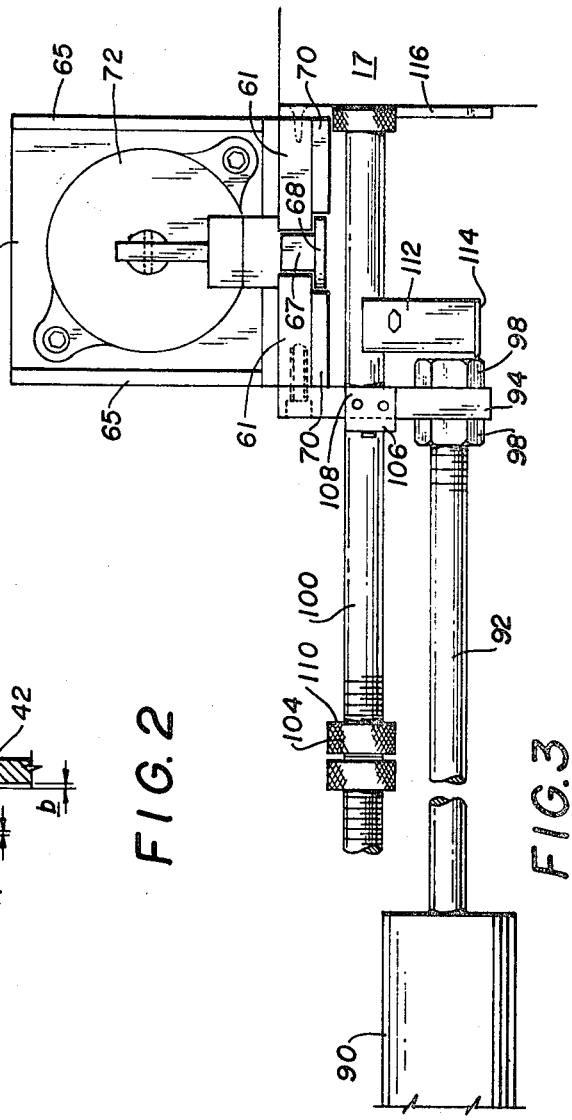

April 7, 1970   G. R. HARRIS   3,504,585
AUTOMATED MACHINE TOOLS
Filed Oct. 27, 1967   3 Sheets-Sheet 3

INVENTOR.
GERALD R. HARRIS
BY Warren, Rubin
Brucker & Chickering
ATTORNEYS

United States Patent Office 3,504,585
Patented Apr. 7, 1970

3,504,585
AUTOMATED MACHINE TOOLS
Gerald R. Harris, 1230 Camelia Drive,
Livermore, Calif. 94550
Filed Oct. 27, 1967, Ser. No. 678,593
Int. Cl. B26d 1/46
U.S. Cl. 83—42   7 Claims

ABSTRACT OF THE DISCLOSURE

A machine tool, here illustrated as a band saw, capable of efficient operation by programming a console and initially providing the tool with stock material is disclosed. The material is fed to the work area of the machine in predetermined increments by means of an indexing mechanism which grips the stock and moves it forwardly by a predetermined amount as set directly with respect to the mechanism itself. A main vise secures the stock and an indexing mechanism or movable vise retracts and waits a signal to take a second grip on the stock to index the same to the next work position. The movable vise is formed to grip the stock and advance it to the main vise in a manner which prevents the stock from gradually moving up out of the main vise on successive advancements thereof. The movable vise is also formed and mounted to compensate for misalignment with the main vise and stock warpage.

---

The invention, for which the following represents a detailed disclosure, relates generally to improvements in automated machine tools, and has specific, although not exclusive utility, in devices wherein a work piece is advanced incrementally past a working head.

Current emphasis on high-speed production has rendered smaller machines, such as power band and hack saws of the type employed in metal working shops, as distinguished from home power tools, both expensive and inefficient to use. The purchase of large, high-capacity automated machine tools does not present a practical approach to the performing of tasks such as cutting steel stock into smaller pieces of a specified size. Accordingly, efforts are being directed toward the automation of smaller machine tools, such as hack and band saws as a means of reducing labor costs and increasing unit output.

Referring to the evolution of automated saws, for example, stock material, which may be cylindrical or rectangular, is purchased in standard lengths, and must then be fed to the saw in order to provide the desired lengths to be used in a manufacturing process. In order to automate a device of this type, it is apparent that the stock must be moved past the work head of the saw in predetermined increments, and the sawing operation commenced and ended automatically.

Incremental indexing of the work piece or stock material as it may be referred to poses a significant problem in that stock material is usually heavy, and often large enough in size that positive clamping of the work piece and accurate indexing thereof is difficult. Efforts have been made, in this regard, exemplary of which are the attempts to clamp the stock material near the remote end thereof, and the clamp is then pulled toward the saw by means of a chain, or some other arrangement, and the stock material is urged into abuttment with a positive stop, located beyond the saw blade.

An object of the present invention is to provide a simple, yet highly reliable automated machine tool, of the type described, which is capable of accurate and rapid indexing of stock material in a manner which is fully coordinated with the function of the machine itself so as to provide efficient output with a greatly reduced labor investment.

A problem which is inherent in the movement of any heavy stock material, such as steel, is the inertia of the stock material once it has been put into motion, and the momentum which it develops at this time. It is another object of the present invention to provide an automatic indexing mechanism which positively controls the movement of the stock at all times while it is in motion, and cushions the same to minimize shock when the stock is brought to rest in its desired position, thereby insuring repeatable accuracy in the indexing function of the device.

It is a further object of the present invention to provide an indexing mechanism which automatically compensates for warpage and other non-uniform characteristics of the stock material in a manner which insures positive engagement of the stock in the work area, and further enhances the accuracy with which the material is capable of being indexed.

The apparatus, which comprises the present invention, includes vice jaws which come together to engage the stock material both for indexing, and for securing the same during performance of the machine function. Such vice arrangements demonstrate a tendency toward lifting the stock material upwardly from the table upon which it rests. This is particularly true when the material is of such a size that the actuating force on the vice acts along a line which is below the center of the stock material. A still further object of the present invention is to provide a vice arrangement wherein the stock material is biased, by the vice jaws, toward the supporting surface upon which it resides, thereby permitting the use of an economical vice construction and at the same time eliminating inherent problems therein which effect the accuracy of indexing and the machine function to be performed on the stock material.

Another, and still further object of the present invention is to provide an improved method of automatically performing repeatable functions on a stock material which includes accurate automatic indexing of the material through the machine and timed performance of the machine function in an efficient sequence.

These and other objects and advantages of the present invention will become apparent from the following detailed description, taken in conjunction with the drawings, wherein:

FIGURE 2 is a side elevation, partially fragmented illustrating the indexing mechanism;

FIGURE 3 is an enlarged and partially fragmented end view of the mechanism of FIGURE 2, illustrating the same in its forward stop position;

Figure 8:
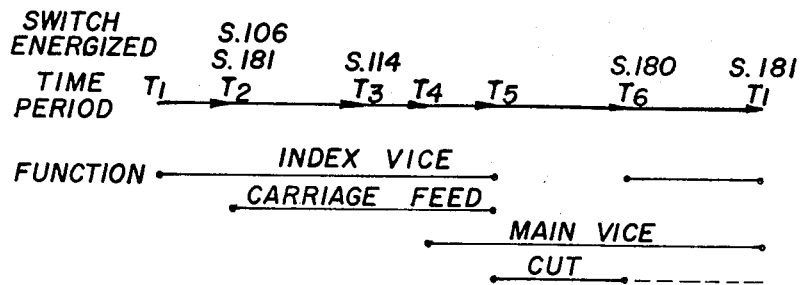
FIGURE 8 is a timing diagram illustrating the sequence of events which occur during preferred mode of operation of the band saw of FIGURE 1.

While the following description relates the invention to its use in conjunction with a power band saw of otherwise conventional construction, it will be appreciated that the invention is not so limited, and, indeed, may be of considerable significance as an adjunct to a variety of other machine tools.

Moreover, while certain specific embodiments of the invention will be hereinafter described, and are illustrated in the drawings, the embodiments disclosed represent what is now believed to be a preferred embodiment of the device, and the description is presented by way of exemplification of the invention, and not by way of limitation. It is the intention that the invention be limited solely by the spirit and scope of the claims, hereinafter presented.

GENERAL ARRANGEMENT

Figure 1:
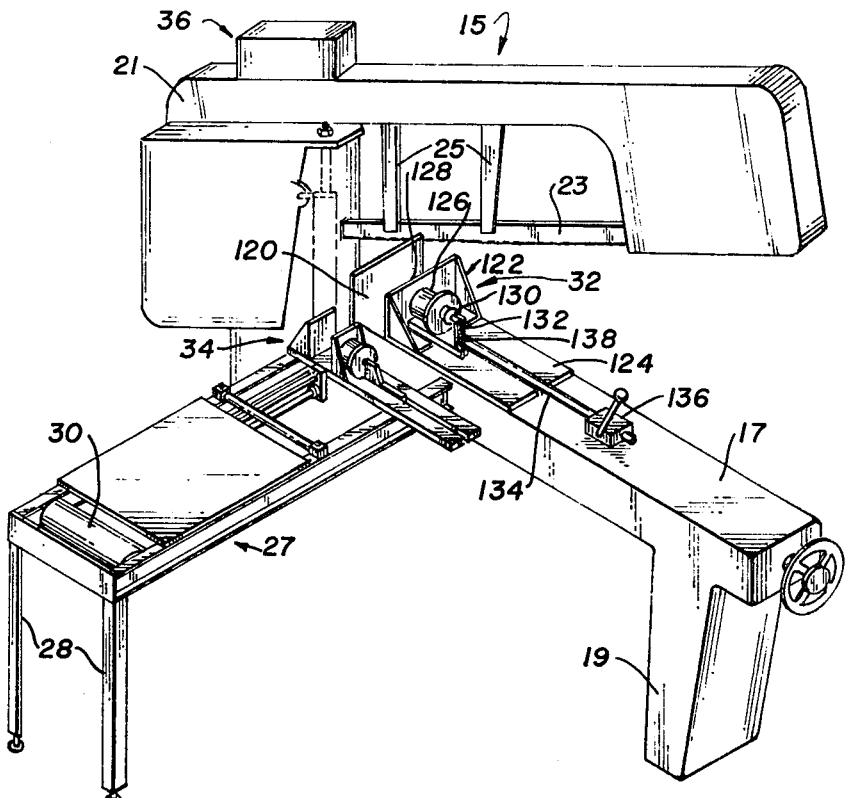
FIGURE 1 is a perspective of an exemplary band saw embodying the improvements which comprise the present invention.

With reference now to the drawings, and initially to FIGURE 1 thereof, the improvements, which comprise the present invention, are illustrated with respect to a metal cutting band saw indicated generally at 15. The band saw 15, which is of a generally known construction, comprises a bed 17 supported on pedestals 19, which may be formed integrally therewith, and includes a cutting head 21 which is pivotally mounted, in some suitable fashion, with respect to the bed 17. The cutting head supports a continuous cutting blade 23 and supports 25 are provided, in this instance extending downwardly from the upper portion of the head, to support the blade in a generally vertical posture in the intended cutting area.

An exemplary feed table 27 is directly connected, or otherwise rigidly supported with respect to the bed 17, and extends at approximately right angles to the plane of the blade 23. It is the function of the feed table to support the stock material while it is being fed into the saw. To this end, the table is provided with legs 28 at the end thereof remote from the saw 15. It will be appreciated that intermediate supports, in the form of legs, or any other suitable structure, may be provided in those instances where the feed bed is long enough to make such additional support desirable, and, of course, in those instances where the load to be carried by the feed bed suggests the desirability of additional support. Rollers, such as roller 30 are provided on the bed to minimize the effort necessary to move the stock material toward the saw.

In order to secure the stock material during the sawing operation, a main work securing vice mechanism is provided on the bed 17, immediately adjacent the word area traversed by these saw blades 23. This mechanism is indicated generally at 32 and is designed to clamp and securely hold the work piece during the actual sawing operation.

Indexing of the stock material to the work area is accomplished by means of an indexing vice mechanism which is movably mounted on the feed table 27, and is indicated generally at 34.

Finally, in order that the device may be operated from a single station, a control console 36 is conveniently disposed atop the cutting head. It will be appreciated that the specific location of the console involves a matter of choice and does not constitute a facet of the invention.

THE INDEXING VICE MECHANISM

It is a feature of the present invention that the stock material, irrespective of its size, is rapidly and precisely indexed toward the working area of the saw in a manner which permits the cutting of pieces from the stock with repeatable accuracy up to 0.003 in. automatically, and in proper sequence with the other operative parts of the device. This is accomplished by means of the improved indexing vice mechanism 34, the significant elements of which are illustrated mainly in FIGURES 2 and 3 of the drawings.

The mechanism 34 is supported for movement along the feed table 27, on a carriage 40. As will be seen in FIGURE 2, the feed table is provided with a pair of spaced L-shaped frame members 42, each of which have inturned horizontal rail members 43 defining guideways upon which the carriage 40 is supported for movement. In order to secure the carriage in bearing relation with respect to the rails 43, runners 45 are provided, depending from the underside of the carriage where they are secured by means of fasteners 47. The runners define a channel into which the rail 43 extends. The top surface 48 of the rails, and the surface 49 of the carriage adjacent thereto, are polished and hardened in order to minimize sliding friction between them as the carriage moves over the rails.

Supported on the carriage 40, for movement therewith, are mating vice jaws 51 and 52. The jaw 51, which comprises a face place 54, welded or otherwise mounted at right angles to a base plate 56, is secured directly to the carriage by means of any suitable fastener 58. Additional rigidity is provided for the face plate 54 by virtue of the buttress plate 59 secured between the upstanding 54 and the base member 56.

In order that the vice may accommodate various sizes of stock, the vice jaw 52 is supported for movement relative to the jaw 51. With reference to FIGURE 3, it will seen that that the carriage 40 includes a pair of spaced plates 61. The jaw 52 is of similar construction to the jaw 51, i.e., it includes an upstanding face plate 63 secured, such as by welding, to a base plate 64, and is provided with a buttress plate 65.

The jaw 52, instead of being directly mounted to the carriage, is secured, by the base plate 64, to a T-shaped runner 67. The runner 67, as may be seen in FIGURE 3, extends through the face between the plates 61, there being sufficient space between the terminal edges of those plates and the side walls of the runner to permit sliding of the jaw on the plates. The cross member 68 of the T extends beneath the plate 61 to prevent lifting of the jaw, and limit plates 70 are provided to prevent twisting of the runner and consequent misalignment of the jaw 52.

In order that operation of the machine may be accomplished automatically, it is necessary that the jaw 52 be automatically actuated to claim and unclamp a work piece on the feed table. One way of accomplishing this is illustrated in FIGURE 3, wherein a fluid motor 72 is secured in the pocket defined between the face and base plates, and the buttress plates. The actuator rod 74 which extends from the rear of the fluid motor casing, is connected to a link 76 which is pivoted at 77 to the runner 67. A reaction link 79 is secured to the link 76 by a pivot pin 80 and is, itself, rigidly fixed with respect to the carriage by means of a manual clamping arrangement actuated by the handle 82. Clamping is accomplished by fastening reaction link 79 to a runner 84 which is conveniently T-shaped in the same manner as the runner 67. An intermediate block 86 is formed with a truncated cylindrical aperture 86, and the portion of the handle 82 which extends into that aperture is formed with a complementary cam flat thereon. Accordingly, rotation of the handle will result in forces tending to spread the reaction link 79 and the block 86.

As a consequence of the attachment of the link 79 to the runner 84, the runner is pulled upwardly against the plates 61 of the carriage and the plates are squeezed between the block 86 and the runne 84. This locks the reaction link to the carriage, and when the fluid motor is actuated in a direction to urge the actuator rod outwardly to the left as seen in FIGURE 2, the link 76 will be caused to rotate about the pivot pin 80, which is now rigid by virtue of the locking of the reaction link 79. Since the jaw 52 is mounted on the movable runner 67, the force of the actuator rod 74 is transmitted through the link 76 to the pivot 77, bringing about a change of direction which results in movement of the runner, and thus the jaw 52, toward the jaw 51. Such movement provides the clamping action against a work piece of stock material disposed between the jaws. It will be appreciated that the stroke of the fluid motor need be very short since the jaw may be initially positioned in close proximity to the surface of the work piece to which it will engage by simply releasing the handle 82 and advancing the same until the desired spacing is achieved.

It is an attribute of the present invention that the clamping force generated on the stock between the jaws 51 and 52 tends to bias the stock downward toward engagement with the bed of the feed table even though the stock material may be so large that the center thereof lies somewhere above the line of action of the fluid motor 72 as transmitted through the face plate 63 of the jaw. In keeping with this aspect of the invention, the fixed jaw 51 is secured with respect to the carriage so that the angle between the face plate 54 and the bed of the carriage is approximately 89½°. It has been found that an angular relationship of 89° plus or minus one-half a degree provides satisfactory operation. In order to achieve a similar angular relationship for the jaw 52, a wedge 88 is fitted between the base plate 64 and the runner 67 to which it attaches. By use of a wedge, the angular relationship may be adjusted where desired, although it will be appreciated that this relationship may be build into the jaw to provide a permanent structure.

The initial tilt given to the face plate 63 is complimented by a forward extension of the runner 67 in the direction of the jaw 51, as seen in FIGURE 2. The forward extension, which may be on the order of one to two inches, serves as a reaction member for force couples generated by the application of force to a work piece which extends above the jaws 51 and 52, respectively. It has been found that under these circumstances, a point P, located at the foot of the face plate 63, where it rests on the upper surface of the plates 61, acts as a pivot point about which a reaction develops tending to maintain clamping forces on the stock material in a downward direction, or at the very least, in a horizontal plane, but never in a direction which would tend to urge the stock material from the bed of the feed table.

By virtue of the short stroke required for clamping and unclamping of the indexing vice, the action of the vice is rapid, and lends itself to automatic operation. Accordingly, a piece of stock material is readily engaged, advanced and released by the mechanism of FIGURES 2 and 3.

More specifically, indexing of the mechanism 34 is accomplished, in keeping with this aspect of the invention, by means of a fluid motor 90, the casing of which is conveniently grounded to the feed table. An actuator rod 92 engages a depending drive plate 94 which is fastened to the carriage in any suitable manner. The actuator 92 extends through an aperture 96, which may be threaded to receive the threaded end of the rod. Lock nuts 98 are disposed on either side of the rod extending through the plate, and are snugged against the plate to rigidly secure the same for indexing the carriage. It will be evident that actuation of the fluid motor will cause the carriage to ride on the rails 43 toward, or away from, the work area of the saw.

In order that the travel of the carriage might be precisely controlled, a stroke control rod 100 is provided. Accuracy of the stroke is insured by placement of the axis of the rod 100 directly above, and co-planar with the line of action of the rod 92. To inhibit misalignment due stress in the carriage, the rod 100 is passed through an aperture 102 in the drive plate, but does not touch the same. Indeed, the rod is maintained stationary relative to the feed table in order to provide a proper frame of reference for measuring the stroke of the carriage. As may be seen in FIGURE 3, the rod preferably abuts the bed 17 of the saw and extends rearwardly for a distance appropriate to the length of stroke to be traversed by the device. Knurled stop nuts 104 are mounted on the rod 100, which is threaded, and they define the rear limit of the carriage, e.g., the limit remote from the work area of the saw. In order that the carriage might be rendered responsive to the rear limit, without simply relying upon the nuts 104 to physically stop the same, a position switch 106 is mounted, by means of a bracket 108, to the drive plate, and in alignment with the forward face 110 of the nut 104. Accordingly, as the actuator 92 retracts into the fluid motor 90, drawing the carriage toward the nuts 104, the switch 106 will engage the face 110 of the nut and immediately signal the arrival of the carriage at its rear position, causing the fluid motor 90 to be deactuated.

The forward position of the carriage is determined in essentially the same manner. A stop 112 which carries a switch 114 is clamped to the rod 110. The switch 114 is aligned with the forward face of the nut 98. The position of the stop 112 is such that the leading face of the nut 98 will come to rest against it at precisely the same time as stop members 116, depending from the carriage come to rest in abutting relationship against the bed 17 of the saw. It will be noted that the length of the stops 116 are such that they extend at least to the line of action of the actuator 92. In this manner, any tendency of the carriage to be tipped upwardly on the rails 43 as a result of the motivating force being generated below the plane of the carriage, is eliminated.

In view of the length of most stock, it tends to become warped, or otherwise take a set during handling and storage. The stock is not, therefore, in the usual case, prefectly straight when being fed to the saw. In recognition of this handling problem, the invention provides for the instantaneous compensation due to warpage of the stock material. With reference to FIGURE 2, it will be seen that the guideways, and the runners from the carriage are so positioned that a small space, on the order of .125 inch, is provided at *a* and *b*. Accordingly, when the jaws of the index clamp engage the stock between them, lateral play between the carriage and guideways upon which it moves, brought about by the spacing represented by the dimensions *a* and *b*, permits limited adjustment of the carriage position to accommodate the orientation of the stock between the jaws. Because the carriage is constrained by the actuator 92 and to some extent by the rod 100, as they pass through the drive plate 94, it has been found that adjustment of the carriage position takes place about the plane of the axes of these two members. Moreover, because these members are, themselves elongated, where necessary, a certain amount of bowing of these members will take place in order that the face plates 54 and 63 of the jaws will firmly grip the stock material disposed between them irrespective of the orientation of that material.

WORK SECURING VICE MECHANISM

The stock material is secured immediately adjacent the work area, where the cutting takes place, by means of a main vice mechanism, shown in its proper orientation in FIGURE 1, at 32. The main vice comprises a fixed jaw 120, the face of which is co-planar with the face of the plate 54 of the main indexing vice, and a movable vice jaw 122. The upstanding faces of both the fixed and movable jaws are tilted inwardly in a manner discussed with respect to the main indexing vice. Accordingly, the stock is not only firmly engaged, but biased toward the bed of the saw, and therefore, held firmly in the proper position for accurate cutting.

In the embodiment illustrated in FIGURE 1, the movable jaw 122 is mounted on a base plate 124, which is slidable on the bed 17. As in the case of the main indexing vice, a fluid motor 126 is mounted to the back of the upstanding member, face plate 128, and an actuator member 130 extends outwardly from the fluid motor to engage a link 32. The link is pivotally mounted to the base plate 124, and an elongated positioning link 134, serves as the reaction link for the fluid motor. As will be seen in FIGURE 1, the reaction link is ground by means of a positioning clamp 136. This also permits the initial position of the movable clamping member to be set, as well as the link 134 to be secured to act as a reaction for the fluid motor.

Actuation of the fluid motor will cause the rod 130 to move outwardly against the link 132. The pivot pin 138, which secures the link 134 to the link 132 acts as the point about which the link 132 rotates. Such rotation causes movement of the base plate, which connects to the opposite end of the link 132, toward the stationary vice member 120. In this manner, effective clamping of the stock material is achieved with a very small stroke.

Figure 5:
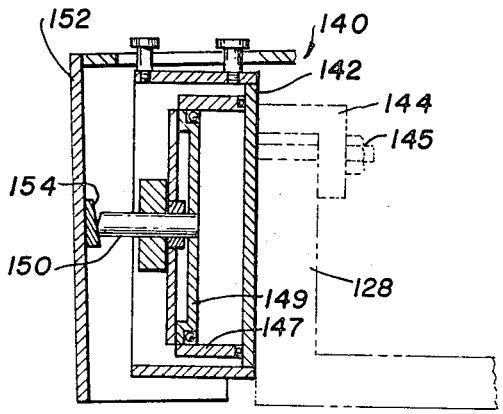
FIGURE 5 is a side elevation of a modified form of a main vice member, the same being sectioned to show details of construction.

One of the attractive aspects of the present invention is its ready adaptability to existing machines. Since virtually all existing machines of this type have a main clamping vice which includes a fixed and movable member. Structure is provided which permits modification of an existing movable vice jaw to the automatic operation which characterizes the present invention. Such structure is illustrated in FIGURE 5, and comprises an auxiliary automatic vice jaw indicated generally at 140. The mechanism 140 includes a main housing 142 which is readily secured to the upstanding member 128 of the movable jaw by means of L brackets 144 which fit over the top of the member 128 and are secured by means of a stud 145. The main housing includes a fluid motor 147, having an actuator piston 149 connected to an actuator rod 150. The rod engages a movable jaw member 152, which takes the place of the upstanding face plate 128 of conventional devices.

In order, in accordance with the invention, to assure that a downward bias is transmitted to the work piece, the actuator rod engages a wedge block 154 secured to the jaw member 152. Accordingly, movement of the rod 150 against the taper of the wedge, causes a downward bias against the jaw, and accordingly, the stock disposed between the vice jaw.

THE CUTTING HEAD CONTROL MECHANISM

Figure 6:
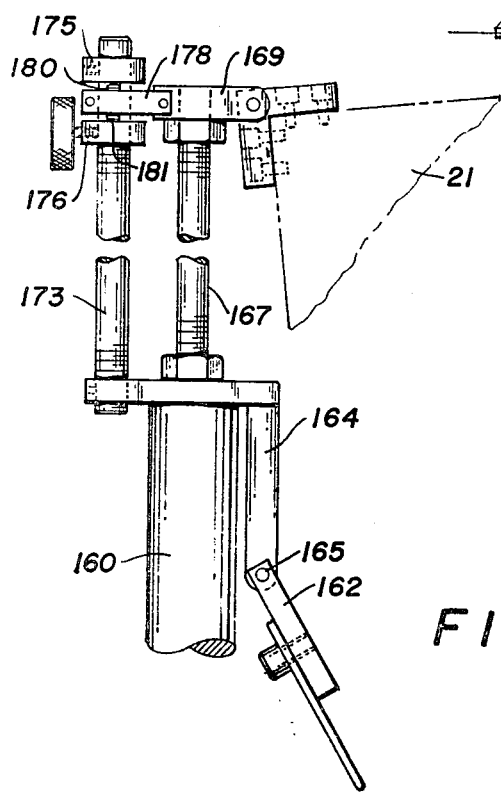
FIGURE 6 is an enlarged fragmentary view of the cutting head control mechanism.

In order that the total machine may be completely automated, the cutting head 21 is, in accordance with the invention, rendered responsive to the completion of a cut and automatically moved out of the path of the advancing stock in order that it might be indexed for the next succeeding cut. This is accomplished, in the embodiment herein illustrated, by the apparatus shown in FIGURE 6. A fluid motor 160 is grounded to the frame of the saw by means of a bracket 162. The bracket 162 engages an L-shaped collar member 164, which is attached to the bracket 162 by means of a pivot pin 165. This linkage permits limited relative movement between the brackets.

The fluid motor is provided with an elongated actuator rod 167 which is connected to the cutting head 21 through a bracket 169. In the instance shown, the cutting head 21 is mounted for movement with respect to the bed, about a point 171. It will be appreciated that, different placement of the mechanism of FIGURES 6, might change the direction of actuation, but such modifications are well within the skill of the art having the benefit of the instant disclosure.

In order to permit precise control of the movement of the cutting head, a stroke control rod 173 is rigidly mounted between the collar 164 and the bracket 169, and is so positioned that its axis is co-planar with the axis of the actuator 167. The rod 173 is threaded, and upper and lower limit nuts 175 and 176, respectively, are provided as a means of settling the upper and lower limits of the stroke of the actuator 167.

Figure 7:
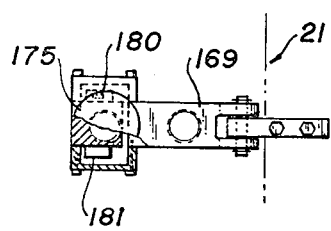
FIGURE 7 is an enlarged, partially sectioned, view of the link extension which houses the limit switches in the cutting head control mechanism.
Figure 4:
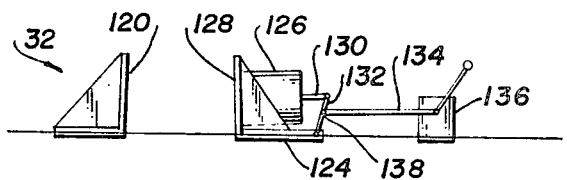
FIGURE 4 is an enlarged view of the main vise mechanism.

In order that the position of the limit nuts may be sensed by the device, and that information transmitted to the fluid motor, an extension 178 from the bracket 169 houses a pair of limit switches 180 and 181. With particular reference to FIGURE 7, the manner in which these switches are housed will be apparent. The switch 180 is positioned to engage the limit nut 175, and the switch 181 is positioned to engage the nut 176. Accordingly, withdrawal of the actuator rod 167 toward the fluid motor, will cause the head 21 to be lifted to a point determined by the nut 176. Upon reaching this position, the switch 181 will be actuated and that information transmitted to the control console 36 which, in accordance with the present invention, resets the cycle of the machine in a manner to be hereinafter explained in considerable detail. Extension of the actuator 167 will, of course, cause the eventual actuation of switch 181 when the same abuts the rod 175. This position indicates that end of the cutting stroke, causing the fluid motor 160 to be reversed to cause the head to be lifted.

THE OPERATIONAL SEQUENCE

While the apparatus which permits the automated operation of the exemplary saw has been described in some detail, proper sequential control of the various functions performed by the machine comprises still another novel facet of the invention. For this reason, a timing diagram (FIGURE 8) has been provided which will assist in the understanding of the sequence of events which transpire.

No effort will be made to provide a detailed description of the electronic apparatus contained in the control console 36. Circuitry of this type is generally known, and a number of rather standard elements may be employed in the actual excitation of the various machine functions. Hence, this control circuitry is not a part of the invention, but rather an adjunct to the accomplishment of the ends of the invention.

Referring specifically to FIGURE 8, and beginning at the point where the switch 181 is actuated by the stop nut 176, the cycle, which has been programmed in the control console 36, is reset and ready to begin. In this posture, the cutting head 21 is raised, the indexing clamp has been withdrawn to a position as determined by the stop nut 104 (FIGURE 3) and the jaws 51 and 52 are closed about the stock material.

The chart of FIGURE 8 is scaled to indicate a series of time periods numbered $T_1$, $T_2$, $T_3$ and so on. Reference to any such time period is a reference to all that transpires within that period, and not to the vertical line which represents the initiation of that period. It will also be appreciated that the cycle may begin anywhere, but the sequence remains the same.

Beginning now with the initiation of period $T_1$, which begins at the resetting of the control by the actuation of switch 181, the carriage advances at time period $T_2$ toward the machine tool, as may be observed on the line indicating the carriage feed. The index vice is, of course, closed at the initiation at this period, and remains closed during the movement and the stock is advanced to the work area of the saw over the bed of the feed table.

When the nose of the advancing actuator rod 92, represented by the nut 98 on the forward end thereof, abuts the actuator nib of the switch 114, the arrival is instantaneously signaled to the console by the switch, and an electronic time delay $T_3$ is initiated. During this time delay, the carriage, under the influence of the actuator, continues to advance for a period of approximately one-half second. Further advancement is possible because it is possible to depress the nib of the switch for a short distance before the end of the actuator firmly abuts the stop member 112, and, of course, the stop member 116 abuts the bed 17 of the saw. Also during this period, the cushion of air which has been found to be a convenient fluid for powering the fluid motors, including fluid motor 90, has built up forwardly of the piston in the motor to thereby decelerate the same at a slower rate and effectuate a cushioning of the shock of the carriage and stock material as it comes to rest on the stops.

At the end of approximately one-half second, a second electrical time delay, indicated at $T_4$ is initiated. During this time delay, pneumatic pressure is continuously built up in the fluid motor 90 in order to bias the carriage against the stop. This bias is not removed until the main vice clamp has control of the stock material, and in this manner, extreme accuracy in the indexing of the carriage, and thus the stock material, is achieved.

At the initiation of the second time delay, $T_4$, the main vice on the bed of the saw begins to close, and at the end of that time delay, which is the initiation of the time period $T_5$, the cutting head is lowered and cutting begins. At the same time, the index vice opens, and pressure in the fluid motor 90 is reversed, causing the carriage to retract to a position wherein position switch 106 becomes energized. The effect of this action is not immediately felt in that switch 106 is wired in series with switch 181, and is operable only to signal to that switch that the carriage is returned, and is in position for the next stroke.

Cutting is ended at the end of time period $T_5$ at which time, switch 180 is actuated, causing the cutting head to rise. At the same time, the index vice again closes on the stock material and is in position to advance the stock at the beginning of the next cycle.

At the end of time period 6, the main vice releases and switch 181 is actuated, which, in conjunction with switch 106, which has previously been actuated by the return of the carriage, causes the control to reset for the beginning of the next cycle.

It will be observed that, during all of the time periods involved, positive control over the position of the stock material is maintained. Moreover, air pressure is employed to insure that the carriage is, at all times, at the limits of its travel, thereby insuring extreme accuracy in the indexing of the stock material.

I claim:

1. For use in incrementally feeding a work piece supported on a feed table to a work area on a machine, a vise comprising, a vise carriage mounted adjacent said area for reciprocal movement relative thereto, a pair of jaws at least one of which is a movable jaw, said movable jaw comprising a work engaging face plate, a base plate supporting said face plate, and a runner, said runner being fastened to said base plate and extending beneath said carriage in bearing relation thereto and being formed to secure said movable jaw to said carriage for reciprocation thereon, said runner being longer than said base plate in a direction of clamping movement thereof, the remaining of said jaws being secured to said carriage in opposed relation to said movable jaw, and means connected with said movable jaw for holding the same when in its clamped position against the work piece so as to exert a force on the work piece in a direction to bias the same toward contact with the feed table.

2. The apparatus as set forth in claim 1 wherein a wedge is disposed between said base plate and said runner so that said face plate forms a predetermined obtuse angle with the carriage.

3. The apparatus as set forth in claim 2 wherein the angle between the carriage and the face plate is between 90.5 degrees and 91.5 degrees.

4. A method of automatically feeding an elongate work piece to a machine tool having a working head comprising the automatically controlled sequential steps of:
(a) Engaging the work piece with an indexing vice mechanism mounted for movement on a feed table;
(b) Moving the indexing vice toward the machine tool;
(c) Actuating a time delay switch to initiate a first dwell period during which the mechanism comes to a halt against a fixed stop, and a bias is built up against the carriage to hold the same against the stop;
(d) Initiating a second dwell period, and simultaneously clamping the work piece by a main clamping mechanism disposed adjacent the working head;
(e) Simultaneously moving the working head against the work piece and releasing and retracting the indexing mechanism;
(f) Moving the working head away from the work piece;
(g) Actuating a switch with the work head to reset the cycle by releasing the main clamping mechanism and engaging the indexing mechanism.

5. The method as set forth in claim 4 wherein the reset switch is connected in series with the switch actuated by the index mechanism in its retracted position whereby the cycle cannot reset without the indexing mechanism being fully retracted.

6. For use in incrementally feeding a work piece to a main gripping means adjacent a work area on a machine, a power indexing mechanism comprising, a feed table and a carriage mounted thereon for reciprocal movement, means formed to permit movement of said carriage about a vertical axis to allow compensation for work piece warpage and misalignment of said carriage with said main gripping means, said means including guideways formed in said feed table and mating channels formed in said carriage, said guideways and channels being formed and positioned relative to one another to define a space therebetween to permit said movement of said carriage toward alignment with said main gripping means, an indexing vise on said carriage for gripping of said work piece, said vise including a movable jaw and clamping means connected with said movable jaw for holding the same in clamped position against the work piece.

7. For use in incrementally feeding a work piece supported on a feed table to a work area on a machine, a power indexing mechanism comprising, a carriage mounted on the feed table for reciprocal movement relative to the work area, an indexing vise on said carriage including a movable jaw and means connected to said movable jaw for holding the same in clamped position against the work piece, power means for driving said carriage to and from said work area, and stop means secured to said mechanism and positioned to determine the limit of travel of the carriage towards the work area, said stop means being further formed and positioned for engagement of said mechanism thereby to induce a movement in said carriage tending to cause said carriage to be rotated about a horizontal axis so as to tend to cause the stock at said work area to be depressed towards the feed table.

References Cited

UNITED STATES PATENTS

| | | | |
|---|---|---|---|
| 2,428,493 | 10/1947 | Haller | 83—247 X |
| 2,929,626 | 3/1960 | Weymouth. | |
| 2,932,229 | 4/1960 | Crane | 83—206 X |
| 3,140,032 | 7/1964 | Heath et al. | 226—162 X |
| 3,125,270 | 3/1964 | Ronfeldt | 226—162 X |
| 3,172,323 | 3/1965 | Burd | 83—277 X |
| 3,289,507 | 12/1966 | Grewe | 83—206 X |

JAMES M. MEISTER, Primary Examiner

U.S. Cl. X. R.

83—201.07, 247, 277, 282; 226—162